United States Patent [19]
Tiesinga et al.

[11] Patent Number: 5,798,913
[45] Date of Patent: Aug. 25, 1998

[54] POWER-SUPPLY AND COMMUNICATION

[75] Inventors: Jan Tiesinga; Peter S. Viet, both of Drachten; Johannes A. T. Driessen, Hoogeveen; Paul A. C. Beijer, Eindhoven, all of Netherlands

[73] Assignee: U.S. Philips Corporation, New York, N.Y.

[21] Appl. No.: 727,613

[22] PCT Filed: Feb. 6, 1996

[86] PCT No.: PCT/IB96/00090

§ 371 Date: Oct. 16, 1996

§ 102(e) Date: Oct. 16, 1996

[87] PCT Pub. No.: WO96/25786

PCT Pub. Date: Aug. 22, 1996

[30] Foreign Application Priority Data

Feb. 16, 1995 [EP] European Pat. Off. ............ 95200371
Nov. 29, 1995 [EP] European Pat. Off. ............ 95203285

[51] Int. Cl.$^6$ ............................................. H02M 3/335
[52] U.S. Cl. ............................................. 363/21
[58] Field of Search .................. 15/319, 330, 339, 15/412; 363/20–21

[56] References Cited

U.S. PATENT DOCUMENTS 5,081,738  1/1992  Schiller et al. ................ 15/339
5,708,572  1/1998  Bergk ................................ 363/21

FOREIGN PATENT DOCUMENTS

4407529C1  6/1995  Germany.

*Primary Examiner*—Matthew V. Nguyen

[57] ABSTRACT

A power-supply and communication circuit is based on a flyback converter with a transformer (6) whose primary winding (10) is periodically connected to a supply voltage by means of a switching element (8) in the rhythm of control pulses from an oscillator (24). Data communication to the secondary electronic circuitry (4) is effected by interrupting the control pulses in response to a first data signal (SDTA1) to be transmitted. The absence of the alternating voltage across the secondary winding (18) is detected by means of a peak detector (28) and converted into a received first data signal (RDTA1). Data communication to the primary electronic circuitry (2) is effected by actively modulating the rectified voltage at the secondary side by means of a modulator (30) in response to a second data signal (SDTA2) to be transmitted. The resulting fluctuations in the flyback voltage across the primary winding are detected by means of a second peak detector (32) and converted into a received second data signal (RDTA2).

17 Claims, 6 Drawing Sheets

POWER-SUPPLY AND COMMUNICATION

BACKGROUND OF THE INVENTION

1. Field of the Invention

This invention relates to a power-supply and communication circuit for an electrical apparatus, comprising: a first electrical unit, a second electrical unit which receives electric power from the first electrical unit via a transformer having a primary and a secondary winding, the secondary winding supplying a secondary alternating voltage, and means for transmitting data signals between the first electrical unit and the second electrical unit via the transformer.

The invention also relates to an electrical apparatus comprising such a power-supply and communication circuit. The invention further relates to a handle for a vacuum cleaner, the handle comprising the second electrical unit, and to a suction part for a vacuum cleaner, the suction part comprising the second electrical unit.

2. Description of the Related Art

Such a power-supply and communication circuit and electrical apparatus are known from U.S. Pat. No. 5,081,738, which discloses a vacuum cleaner with motor power control having control switches on a handle. The control switches form part of a second electrical unit in the handle, which is powered from a first electrical unit in the canister via a transformer. The primary winding of the transformer forms part of an LC resonant circuit which is driven by an oscillator. The voltage across the secondary winding is rectified and powers the second electrical unit. In the second electrical unit a capacitor is connected in parallel with the secondary winding and the value of this capacitor can be influenced in response to the control switches on the second electrical unit. A change in the capacitor value causes the resonant frequency of the LC circuit to change, as a result of which the amplitude of the voltage across the LC circuit at the primary side of the transformer changes likewise. This amplitude variation is detected and further processed. In this way the second electrical unit receives power from the first electrical unit and data communication is possible from the second electrical unit in the handle to the first electrical unit in the canister.

When the prior art power-supply and communication circuit is used in a vacuum cleaner, the impedance of the connecting wires in the hose between the secondary winding of the transformer and the second electrical unit in the handle is included in the LC resonant circuit. This hose impedance is subject to spread. The impedance of the transformer itself also exhibits a substantial spread. The influence of the spreads complicates the design and may lead to inaccurate results. Moreover, the prior art power-supply and communication circuit is only suitable for data communication from the second unit to the first unit.

SUMMARY OF THE INVENTION

It is an object of the invention to provide an accurate power-supply and communication circuit.

A first aspect of the invention is characterized in that the power supply further comprises a switching element in series with the primary winding, which switching element has a control terminal for receiving control pulses for periodically turning on and turning off the primary winding, and in that the power-supply and communication circuit further comprises at least one combination from a first combination of first means for obtaining a suppression of said periodically turning on and off of the primary winding in response to a first data signal generated in the first electrical unit and second means in the second electrical unit for detecting of fluctuations in the secondary alternating voltage as a result of the suppression, and a second combination of third means for actively modulating the secondary alternating voltage in response to a second data signal generated in the second electrical unit, and fourth means in the first electrical unit for detecting fluctuations in a primary alternating voltage across the primary winding as a result of the modulation of the secondary alternating voltage.

It is a second aspect of the invention to provide an electrical apparatus comprising a power-supply and communication circuit, wherein the transformer comprises a further secondary winding supplying a further secondary voltage, signal processing and deflection circuitry receiving an input signal and the further secondary voltage to generate drive signals for driving a picture display device, and a microcomputer receiving the output data signal and supplying command signals to control the signal processing and deflection circuitry.

It is a third aspect of the invention to provide an electrical apparatus comprising a first functional unit and a second functional unit cooperating therewith, and a power-supply and communication circuit, the first electrical unit and the transformer being included in the first functional unit and the second electrical unit being included in the second functional unit.

It is a fourth aspect of the invention to provide a handle for a vacuum cleaner comprising an electrical unit for receiving an alternating voltage, characterized in that the alternating voltage includes periodical waveforms which are suppressed in response to an input data signal, and the electrical unit comprises means for detecting fluctuations in the alternating voltage to supply an output data signal which is a regenerated input data signal.

It is a fifth aspect of the invention to provide a suction part for a vacuum cleaner, the suction part comprising an assembly of a hose and a handle, the hose comprising: electrical coupling means at a first end of the hose for coupling the hose to a canister of the vacuum cleaner, and electrical conductors, for transporting an alternating voltage from the first end of the hose to the handle, the handle accommodating an electrical unit for receiving the alternating voltage, characterized in that the alternating voltage includes periodical waveforms which are suppressed in response to an input data signal, and the electrical unit comprises means for detecting fluctuations in the alternating voltage to supply an output data signal which is a regenerated input data signal.

By means of the power-supply and communication circuit in accordance with an embodiment of the invention, in which both the first and the second combinations are present, it is possible (1) to supply power to the electronic circuitry of the second electrical unit, (2) to provide data communication from the first electrical unit to the second electrical unit, (3) to provide data communication from the second electrical unit to the first electrical unit, and (4) to provide a shock-protected isolation between the first and the second electrical unit. The shock protection is important, inter alia for mains-powered domestic appliances such as vacuum cleaners, sun-tanning apparatus, hair-drying hoods, massaging apparatus and the like, which can be remote-controlled by means of a functional unit or remote-control unit, which includes the second electrical unit and which by means of electrical conductors is coupled to the apparatus to be controlled, which apparatus includes the first electrical unit and the transformer. The power-supply and communication circuit in accordance with this embodiment of the invention provides a Safety Extra Low Voltage (SELV) circuit, so that other—generally less stringent or even no—electrical certification requirements are imposed on the second electrical unit and all the components between this second unit and the secondary winding of the transformer. For a vacuum cleaner this allows the use of simpler and cheaper couplings between the canister and the handle and, in addition, the safety requirements imposed on the wiring between the handle and the canister are much less stringent.

In the power-supply and communication circuit in accordance with the above-mentioned embodiment of the invention, two-way data communication is possible from the first electrical unit to the second electrical unit and vice versa. However, the scope of the invention covers: a power-supply and communication circuit with data transfer only from the first to the second electrical unit, or, a power-supply and communication circuit with data transfer only from the second to the first electrical unit; or, a power-supply and communication circuit with data transfer both from the first to the second electrical unit and from the second to the first electrical unit. The power supply provides the supply voltage for the second electrical unit, which is fully insulated from the first electrical unit by the transformer.

The first and second means provide the communication from the first electrical unit to the second electrical unit. In a preferred embodiment, the first means turn off the switching element a number of times during a number of periods and subsequently turn it on again, depending on the data to be transmitted.

The non-prepublished document DE-C-4,407,529 discloses a switched power supply and a communication circuit. The power supply has a transformer with a primary and a secondary winding. The windings are mains-separated to divide an apparatus into a primary side (the first electrical unit) connected to the mains, and a mains-insulated secondary side (the second electrical unit) at which most circuitry of the electrical apparatus is present. The primary winding is periodically connected to a rectified mains voltage by a switching device which periodically opens and closes in response to a switching signal. The secondary winding generates a voltage for supplying power to circuitry at the secondary side of the apparatus. The communication circuit transfers an information signal from the primary side to the secondary side via the power supply. The information signal is a remote control command received by a remote control receiver at the primary side. The remote control command comprises a stream of data bits and has to be transferred to a microcomputer at the secondary side to control the circuitry at the secondary side. The communication circuit comprises a modulation circuit at the primary side and a demodulation circuit at the secondary side. The modulation circuit adapts the switching signal in response to the information signal, depending on the type of power supply. In a power supply which is frequency- modulated to stabilize an output voltage, a small pulse is added to the switching signal to close the switching device for a predetermined short period, in addition to the period in which the switching device is already closed. In a power supply which is switched at a fixed frequency, the ratio of the period during which the switching device is opened and closed, respectively, is adapted to have the switching device closed for only a predetermined short period. The demodulation circuit senses a secondary voltage generated by the secondary winding and generates an output signal. The output signal is active if a pulse with a duration which is not longer than the predetermined short period is detected.

It is a drawback of the power-supply and communication circuit of DE-C-4,407,529 that in normal operating conditions of the power supply, in which no transfer of data bits is wanted, the power supply is not allowed to close the switching device for a period which is shorter than the predetermined short period.

In a preferred embodiment of the present invention, a control circuit generates periodical control pulses which have an on-period and an off-period during each switching period to cause a switching element to be closed or opened, respectively. The closed switching element connects a primary winding of the power supply circuit to a DC voltage, for example the rectified mains voltage. The control circuit further receives an input data signal which is related to the information signal to keep the switching element open during at least one switching period if the input data signal is active. The input data signal is, for example, a stream of data bits generated by a remote control receiver which receives user commands. In this case, the input data signal is active if a data bit has a logic-one or a logic-zero value, depending on the choice made. In normal operation of the power supply, in which no data is transferred, the primary voltage changes level during each switching period. If the input data signal is active, the switching element is not closed during at least one switching period and the primary voltage will not change level. As the secondary voltage is related to the primary voltage, a detection circuit is coupled to the secondary winding for detecting a change in the secondary voltage supplied by this second winding.

The power supply according to this preferred embodiment of the invention can be operated with the switching element closed during a very short period without transferring data to the secondary side. Such a short period is needed if the power drawn from the power supply is very low, as may be the case during the standby mode of an apparatus. Furthermore, the circuitry which suppresses the switching-on of the switching element is very simple.

In one embodiment, the power-supply and communication circuit is characterized in that the first means comprise a first switching transistor having a control electrode for receiving the first data signal and having a main current path connected to the control terminal of the switching element.

The temporary breaks in the switching of the switching element become manifest as amplitude variations in the secondary alternating voltage. The amplitude variations are detected by the second means, which in an embodiment of the invention are characterized in that the second means comprise a first peak detector coupled to the secondary winding.

The third and the fourth means provide the communication in the reverse direction, i.e. from the second electrical unit to the first electrical unit. During the transmission of data to the first electrical unit, the third means impose an intentional variation of the secondary alternating voltage supplied by the secondary winding. This variation can be imposed by a temporary increase or decrease of a load coupled across the secondary winding, causing the secondary alternating voltage to decrease or increase temporarily. This change becomes manifest as a fluctuation in the peak-to-peak value of the alternating voltage component across the secondary winding, which is reflected to the primary winding. The fluctuation is measured by the fourth means, which in an embodiment of the invention are characterized in that the fourth means comprise a second peak detector coupled to a node between the primary winding and the switching element.

The secondary alternating voltage variation can be imposed in various ways. To this end, an embodiment of the invention is characterized in that a first rectifier diode is coupled in series with the secondary winding for supplying a direct voltage, and in that the third means comprise a second switching transistor and a load element arranged in series with the direct voltage, a control electrode of the second switching transistor being arranged to receive the second data signal. By turning on the second switching transistor, the direct voltage is loaded additionally by the load element, for example a resistor, lamp or LED, as a result of which the direct voltage decreases. This decrease may be undesirable for the further electronic circuitry in the second electrical unit. This is precluded in a further embodiment, which is characterized in that the second electrical unit comprises a second rectifier diode arranged in series with said first rectifier diode and further comprises a first zener diode connected to the direct voltage generated by the first and second rectifier diodes, and in that the load element is a second zener diode connected to a node between the first and the second rectifier diode. The second rectifier diode is cut off if the second zener diode is turned on by the second switching transistor, because the zener voltage of the second zener diode is lower than that of the first zener diode. The further electronic circuitry is insulated from the temporarily decreasing direct voltage in that the second rectifier diode is cut off.

The coding of the data to be transmitted from the first to the second electrical unit should be such that the power supply to the second unit remains adequate. This is achieved by means of a biphase coding, which encodes the information in the transitions of the data signal. It is guaranteed that, regardless of the bit pattern of the data signal, the flyback converter powers the second electrical unit during half the time of data transmission. The coding of the data to be transmitted from the second to the first electrical unit should also meet the requirement that the power supply to the second electrical unit should not be affected too much. Also in this case, a biphase coding may provide the solution.

In general, the power-supply and communication circuit in accordance with the invention is suitable for a mains-powered electrical apparatus comprising a first functional unit and a second functional unit cooperating therewith, the first electrical unit and the transformer being included in the first functional unit and the second electrical unit being included in the second functional unit. In particular, the apparatus is a vacuum cleaner, the first functional unit being a canister accommodating the first electrical unit and the transformer, and the second functional unit being a suction part which can be coupled to the canister and which comprises a handle which accommodates the second electrical unit, coupling of the suction part to the canister resulting in an electrical connection being made between the secondary winding of the transformer and the second electrical unit. The suction part may comprise a hose in which electrical conductors are included, which conductors, at one end, are coupled to the second electrical unit in the handle and at the other end can be coupled electrically to the secondary winding of the transformer in the canister.

The first and second electrical units may be physically separable, as is the case in the aforementioned mains-powered electrical apparatus. The units may also be physically concentrated within the same apparatus, for instance a TV set, audio set and the like. The first unit then comprises the electronic circuitry coupled to the primary winding and the second unit comprises electronic circuitry coupled to the secondary winding.

In another embodiment, the information signal comprises words containing bits. Each word comprises a first and a second group of bits. The first group of bits determines which system is addressed. System is understood to mean, for example, an electrical apparatus like a television receiver, an audio amplifier, a video cassette recorder, or an audio system containing several of such electrical apparatus. The second group of bits determines the command to be performed by the system addressed. To minimize the influence on the power supply operation of the data transfer from the primary side to the secondary side, the microcomputer only transfers data to the secondary side if the first group of bits addresses the system which comprises the microcomputer. Furthermore, the microcomputer does not transfer the bits of the first group to the secondary side.

In another embodiment, the microcomputer receives the information signal which comprises a stream of data having a given bit rate. The microcomputer transfers the bits to the secondary side as pulses which have a repetition frequency lower than the given bit rate. It is advantageous to lower the rate of data transfer to the secondary side if even a better performance of the power supply is desired, or if the information signal has a very high bit rate. Lowering of the bit rate is especially interesting if the information signal comprises bursts of information which are separated in time, as is the case in most remote control systems in which commands do not follow each other immediately.

A simple embodiment of the detection circuit is also disclosed. The dependent claims define further advantageous embodiments of the invention.

BRIEF DESCRIPTION OF THE DRAWING

These and other aspects of the invention will be described and elucidated with reference to the accompanying drawings, in which.

In these Figures parts or items having the same function or purpose are denoted by the same reference symbols.

DESCRIPTION OF THE PREFERRED EMBODIMENTS

Figure 1:
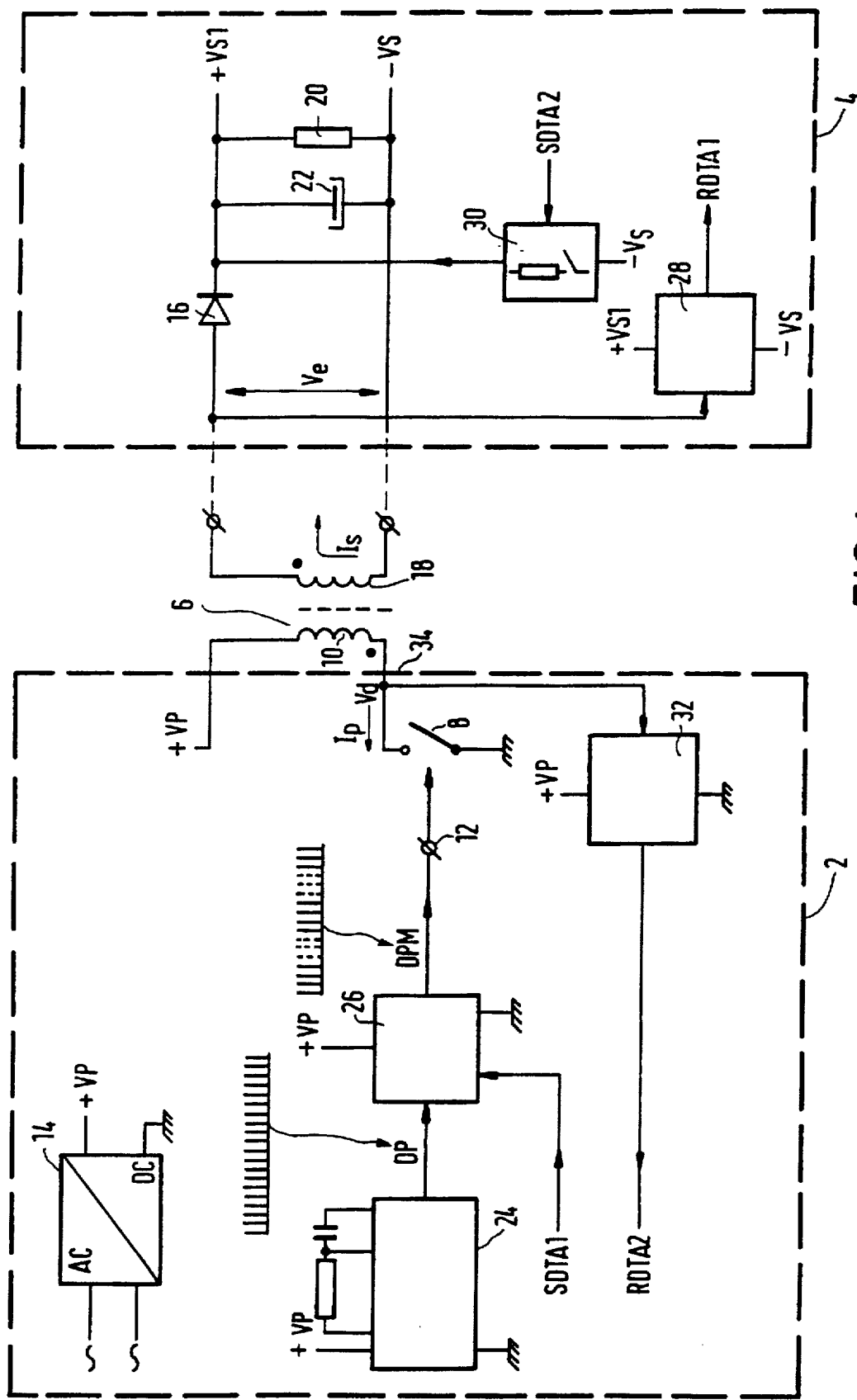
FIG. 1 is a simplified circuit diagram of a power-supply and communication circuit in accordance with the invention.

FIG. 1 shows a simplified electrical circuit diagram of a power-supply and communication circuit in accordance with the invention. A first electrical unit 2 and a second electrical unit 4 are coupled to one another by means of a transformer 6. The second electrical unit 4 is powered from the first electrical unit 2. Furthermore, means are provided for transmitting data signals between the first electrical unit 2 and the second electrical unit 4 via the transformer 6. The transformer 6 forms part of a flyback converter comprising a switching element 8 in series with the primary winding 10 of the transformer 6. The switching element 8 has a control terminal 12 for receiving control pulses for periodically turning on and turning off the switching element 8. When a control pulse is received, the switching element 8 connects the primary winding 10 to the terminals of a supply voltage source 14, one of said terminals being connected to ground and the other terminal supplying a positive voltage VP relative to ground. The switching element 8 has been represented as a switch and may comprise a bipolar transistor or a MOS transistor. The flyback converter further comprises a rectifier diode 16 for rectifying the secondary alternating voltage $V_e$ across the secondary winding 18 of the transformer 6 so as to obtain a direct voltage VS1 for powering the electronic circuitry in the second electrical unit 4. The electronic circuitry is shown symbolically as a load resistor 20 shunted by a smoothing capacitor 22. The transformer 6 provides electrical isolation between the signal ground −VS of the second electrical unit 4 and the signal ground of the first electrical unit 2. This is important, in particular if the supply voltage source 14 is connected directly to the mains voltage. If the alternating voltage $V_e$ on the secondary winding 18 is low enough, the terminals of the secondary winding 18 as well as all the components of the second electrical unit 4 will be safe to touch.

An oscillator 24 generates a continuous train of control pulses DP for turning on and turning off the switching element 8. The continuous train of control pulses DP is interrupted in the first means 26 in response to a first data signal SDTA1 obtained from a first data signal generator (not shown) in the first electrical unit 2. The control pulses are suppressed at a given signal value of the first data signal SDTA1. The second electrical unit 4 comprises second means 28 for detecting fluctuations in the secondary alternating voltage $V_e$ as a result of the suppression of the control pulses in the first means 26. The fluctuations are translated to a received first data signal RDTA1. In this way data communication is possible from the first electrical unit 2 to the second electrical unit 4 via the transformer 6, as will be described in more detail hereinafter.

For data communication in the opposite direction, i.e. from the second electrical unit 4 to the first electrical unit 2, third means 30 are provided for the active modulation of the direct voltage VS1 in response to a second data signal SDTA2 received from a second data signal generator (not shown) in the second electrical unit 4. In their simplest form, the third means 30 comprise a resistor which is connected in parallel with the load resistor 20, already present, by means of a switching element, for example a transistor. As a result of this, the direct voltage VS1 decreases and, as a consequence, the peak-to-peak voltage across the primary winding 10 also decreases, as will be explained hereinafter. This voltage decrease is detected and translated to a received second data signal RDTA2 by fourth means 32 in the first electrical unit 2, which fourth means are connected to the node 34 between the switching element 8 and the primary winding 10.

Figure 2:
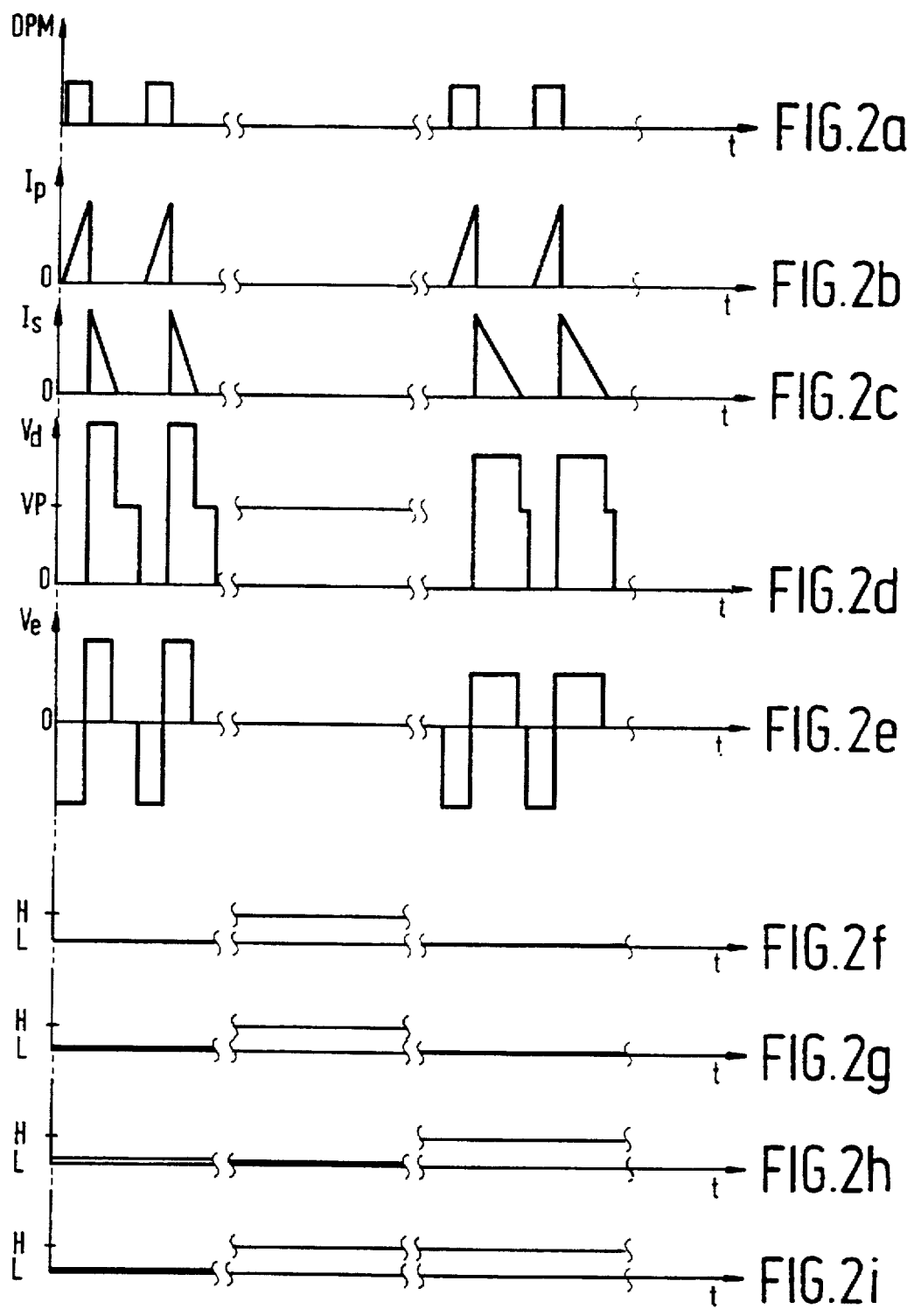
FIG. 2 shows waveforms of a number of signals occurring in a power-supply and communication circuit in accordance with the invention.

FIG. 2 shows waveforms of a number of signals in the power-supply and communication circuit shown in FIG. 1. Waveform a in FIG. 2 shows the control pulses DPM at the control terminal 12 of the switching element 8; waveform b in FIG. 2 shows the current $I_p$ through the switching element 8; waveform c in FIG. 2 shows the current $I_s$ through the secondary winding 18; waveform d in FIG. 2 shows the voltage $V_d$ at the node 34; waveform e in FIG. 2 shows the alternating voltage $V_e$ across the secondary winding 18; waveform f in FIG. 2 shows the first data signal SDTA1 to be transmitted; waveform g in FIG. 2 shows the first data signal RDTA1 received; waveform h in FIG. 2 shows the second data signal SDTA2 to be transmitted; and waveform i in FIG. 2 shows the second data signal RDTA2 received. It is assumed that a comparatively large signal value of the data signals SDTA1 and SDTA2 to be transmitted, indicated as an amplitude H, results in the suppression of the control pulses DP and the active reduction of the direct voltage VS1, respectively, as just described. A comparatively small signal value, indicated as an amplitude L, does not give rise to any action. In FIG. 2 three situations can be distinguished:

I. The signals when no data communication takes place and when the amplitudes of SDTA1 and SDTA2 are L during a communication session;

II. The signals when the amplitude of the first data signal SDTA1 is H during a data communication session;

III. The signals when the amplitude of the second data signal SDTA2 is H and that of the first data signal SDTA1 is L during a data communication session In situation I the flyback converter operates normally. The winding ratio in the transformer 6 has been selected, for example, to be 1:1, so that the peak value of the primary current $I_p$ is equal to the peak value of the secondary current $I_s$. The switching element 8 conducts during a pulse of the pulse train DPM and the current $I_p$ increases linearly to a given maximum. The voltage $V_d$ at the node 34 is then substantially zero with respect to ground. The secondary current $I_s$ is zero because the rectifier diode 16 is cut off. After the pulse the switching element 8 opens, the voltage $V_e$ across the secondary winding 18 changes over, i.e. its sign is reversed, and a decreasing current $I_s$ having the same peak value as the primary current $I_p$ (at least in the present example) flows through the rectifier diode 16 and the load resistor 20 and the smoothing capacitor 22 connected to this diode. When the secondary current $I_s$ has decreased to zero, the secondary voltage $V_e$ becomes zero and the voltage $V_d$ decreases from a peak value which (at least in the present example) is equal to two times the primary supply voltage VP to one time the supply voltage VP. Subsequently, the switching element 8 is turned on again, the voltage $V_d$ decreasing again to zero and the secondary voltage $V_e$ decreasing to −VP.

In situation II the amplitude of the first data signal SDTA1 to be transmitted is H, as a result of which the control pulses to the switching element 8 are suppressed in the first means 26. The flyback converter is now disabled temporarily. The primary current $I_p$, the secondary current $I_s$ and the secondary voltage $V_e$ are then zero, while the voltage $V_d$ at the node 34 is equal to VP. The absence of the alternating voltage $V_e$ across the secondary winding 18 is detected by the second means 28 and translated to a comparatively high amplitude H of the received first data signal RDTA1. It is to be noted that the translation to a high amplitude H is optional. In order to prevent the power supply to the second electrical unit 4 from stagnating too long in the case of a long series of bits all having, for example, the value "1", it is preferred to use a biphase channel coding, a bit of the value "1" being transmitted as an amplitude transition from H to L and a bit of the value "0" as an amplitude transition from L to H. Obviously, an inverse coding is also possible. Thus, it is guaranteed that the flyback converter always remains operative for half the time of a communication session. In principle, it suffices to suppress only one pulse of the train of control pulses DP to transmit one data bit. However, this imposes stringent requirements on the speed of response of the second means 28 and it reduces the susceptibility to interference of the communication system. It is therefore advantageous to suppress a plurality of, for example 3, consecutive pulses in order to extend the period of temporary absence of the alternating voltage $V_e$, so that detection can be effected with simpler second means 28, which are less susceptible to interference.

In situation m the amplitude of the second data signal SDTA2 to be transmitted is H, as a result of which the third means 30 impose a temporary reduction of the direct voltage VS1 across the load resistor 20, for example by connecting an additional resistor in parallel by means of a switching transistor. Owing to the decrease of the direct voltage VS 1, the amplitude of the secondary alternating voltage $V_e$ also decreases during conduction of the rectifier diode 16 and a similar decrease occurs across the primary winding 10 of the transformer 6 (at least in the present example). Since the peak value of the secondary current $I_s$ does not change, the rate at which the secondary current $I_s$ decays will decrease. This is illustrated in column m for the signals c, d and e in FIG. 2. The decrease in peak value of the voltage $V_d$ at the node 34 is detected with the fourth means 32 and is translated to a comparatively high amplitude in the received second data signal RDTA2. Again it is advantageous to use biphase coding in order to ensure that the power supply is disrupted to a minimal extent and to avoid unnecessary dissipation. It is also advantageous to sustain the enforced reduction of the direct voltage for a plurality of, for example 3, cycles of the flyback converter in order to ensure a detection which is simple and immune to noise.

The communication protocol may be in accordance with any desired or known type. One possibility is to transmit a code word from the first electrical unit 2 to the second electrical unit 4 at regular intervals and to subsequently clear the transmission channel for the transmission of a code word from the second electrical unit 4 to the first electrical unit 2. If always a message is returned, the first electrical unit 2 can ascertain whether the connection with the second electrical unit 4 is still intact. It will be obvious that, if desired, a one-way communication system is possible by dispensing with or disabling the combination of the first means 26 and the second means 28 or the combination of the third means 30 and the fourth means 32.

Figure 3:
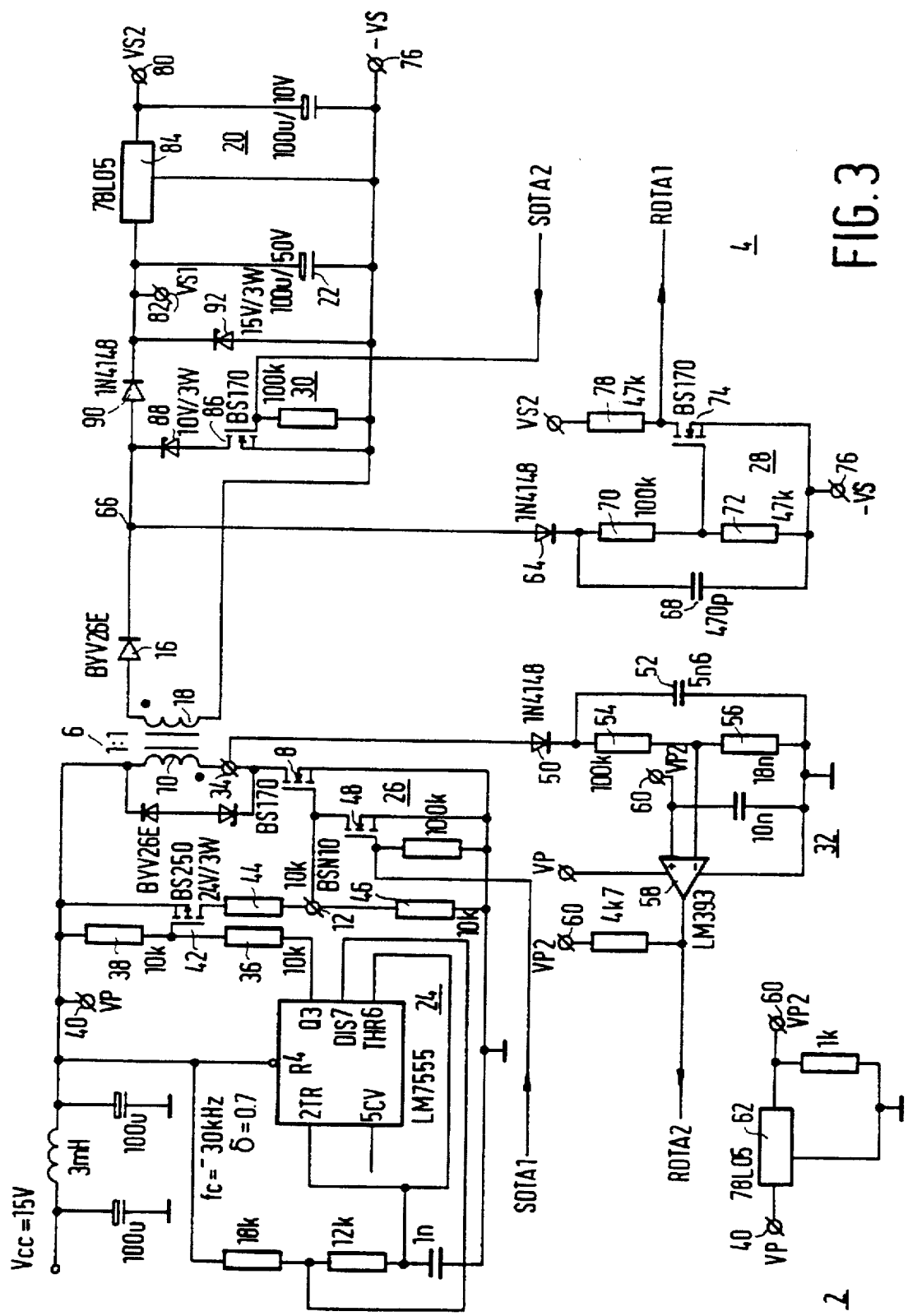
FIG. 3 is a detailed electrical circuit diagram of a power-supply and communication circuit in accordance with the invention.

FIG. 3 shows a detailed circuit diagram of a power-supply and communication circuit in accordance with the invention. The oscillator 24 comprises a commercially available Timer IC LM7555, which oscillates at a frequency of approximately 30 kHz. The Q output at pin 3 is connected to the positive supply terminal 40 via two resistors 36 and 38. A PMOS transistor 42, whose gate is connected to the node between the two resistors 36 and 38, has its source connected directly to the positive supply terminal 40 and its drain to the control terminal 12 via a resistor 44. A resistor 46 connects the control terminal 12 to ground. The transistor 42 converts the control pulses with a duty cycle of 0.7 at the Q output of the Timer IC into a pulse train with a duty cycle of 0.3 to control the flyback converter. The switching element 8 is a MOS transistor having its gate, source and drain connected to the control terminal 12, ground and the node 34, respectively. The first means 26 comprise an NMOS transistor 48 having its source connected to ground and its drain to the control terminal 12, its gate being controlled by the first data signal SDTA1 from a control stage, not shown. When the first data signal SDTA1 is high, the transistor 48 conducts and the gate of the switching element 8 is short-circuited to ground. This interrupts the operation of the flyback converter.

The fourth means 32 comprise a peak detector which detects the varying peak value of the alternating voltage at the node 34 in the case of data transmission from the second electrical unit 4 to the first electrical unit 2. The peak detector comprises a diode 50 having its anode connected to the node 34 and its cathode to a hold capacitor 52, which is shunted by two resistors 54 and 56, whose node is connected to the inverting input of a comparator 58. The non-inverting input of this comparator is connected to a positive supply terminal 60, which carries a reference voltage VP2 supplied by a voltage regulator 62. During data communication from the second electrical unit 4 to the first electrical unit 2, the attenuated peak voltage at the inverting input becomes smaller than the reference voltage at the non-inverting input, as a result of which the received second data signal RDTA2 at the output of the comparator 58 becomes relatively high, as is shown in FIG. 2, column III of signal waveform i.

The second means 28 also comprise a positive peak detector, which detects whether or not there is an alternating voltage across the secondary winding 18. The peak detector comprises a diode 64 whose anode is connected to a node 66, to which the cathode of the rectifier diode 16 is connected. The cathode of the diode 64 is connected to a hold capacitor 68, which is shunted by two resistors 70 and 72, whose node is connected to the gate of an NMOS transistor 74. The hold capacitor 68, the resistor 72 and the source of the transistor 74 are connected to a negative voltage terminal 76 of the rectified voltage. The drain of the transistor 74 is connected to a positive supply terminal 80 via a load resistor 78, which supply terminal carries a voltage VS2 which by means of a voltage regulator 84 has been derived from the rectified voltage at the positive voltage terminal 82, which terminal is also connected to the smoothing capacitor 22. During data transmission from the first electrical unit 2 to the second electrical unit 4, the alternating voltage across the secondary winding 18 disappears, as a result of which the transistor 74 cuts off and the received first data signal RDTA1 at the drain of the transistor 74 becomes relatively high, as is shown in FIG. 2, column II of signal waveform g. It is to be noted that alternatively the cathode of the diode 64 may be connected to the secondary winding 18, i.e. to the node between the anode of the rectifier diode 16 and the secondary winding 18.

The third means 30 comprise an NMOS switching transistor 86, whose gate is arranged to receive the second data signal SDTA2 to be transmitted. The source is connected to the negative voltage terminal 76 and the drain is connected to the node 66 via a zener diode 88. The node 66 is connected to the positive voltage terminal 82 via a second rectifier diode 90. Moreover, a zener diode 92 is connected between the positive voltage terminal 82 and the negative voltage terminal 76. The zener voltage of the zener diode 92 is higher than that of the zener diode 88. During data transmission from the second electrical unit 4 to the first electrical unit 2, the switching transistor 86 is conductive, as a result of which the zener diode 88 is arranged across the rectified voltage at the node 66, which voltage is lower than before this, because the zener voltage of the zener diode 88 is lower than that of the zener diode 92. During this action, the second rectifier diode 90 is also cut off to prevent the smoothing capacitor 22 from being discharged by the zener diode 88. In this way, the power necessary for data communication from the second to the first electrical unit is not drawn from the second electrical unit 4.

Instead of the MOS transistors shown herein, it is also possible to use bipolar transistors.

The power-supply and communication circuit is very suitable for use in mains-powered domestic appliances with remote control, which are electrically connected to the actual apparatus to be controlled by a cable in some way or another. Examples are suntanning equipment, sun beds, foot-massaging apparatus and hair-drying hoods. In the case of vacuum cleaners, there is a trend to arrange the controls of the vacuum cleaner and the indication of the status of the various functions in the handle. Also in this case, the powersupply and communication circuit can be used with advantage.

Figure 4:
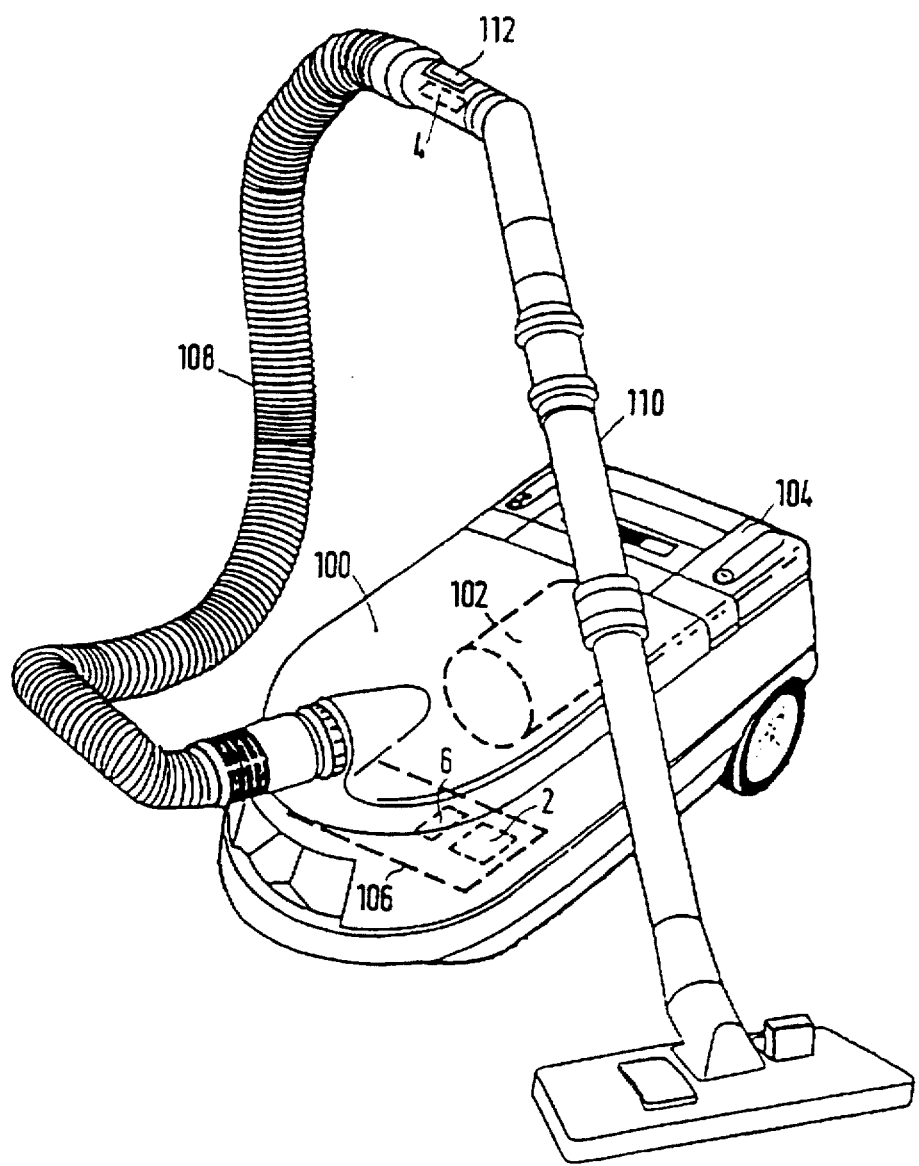
FIG. 4 shows a vacuum cleaner comprising a power-supply and communication circuit in accordance with the invention.

FIG. 4 shows a vacuum cleaner equipped with this circuit. The canister 100 accommodates a suction motor 102, one (or more) hand or foot-actuated switch(es) 104 and the first electrical unit 2, which is situated on a printed circuit board 106 in the canister 100 and which cannot be touched from outside. The printed circuit board 106 also carries the transformer 6, whose secondary winding is connected to the second electrical unit 4 in the handle 112 of a suction part 110 via wires, not shown, in the hose 108 of the suction part 110. The second electrical unit 4 may have control switches, for example for switching the suction motor 102 on and off or for controlling the speed of this motor. Moreover, the handle 112 may accommodate a display to indicate, for example, whether or not the dust bag is full. When the hose 108 is disconnected from the canister 100, the contact of the connecting wires with the canister are exposed. Owing to the full electrical isolation of the power-supply and communication circuit, these contacts are safe to touch and no expensive constructions are necessary for these contacts. Moreover, as a result of this, the electrical safety requirements imposed on the hose and the handle are less stringent or are not imposed at all, which enables a cheaper construction to be used.

Figure 5:
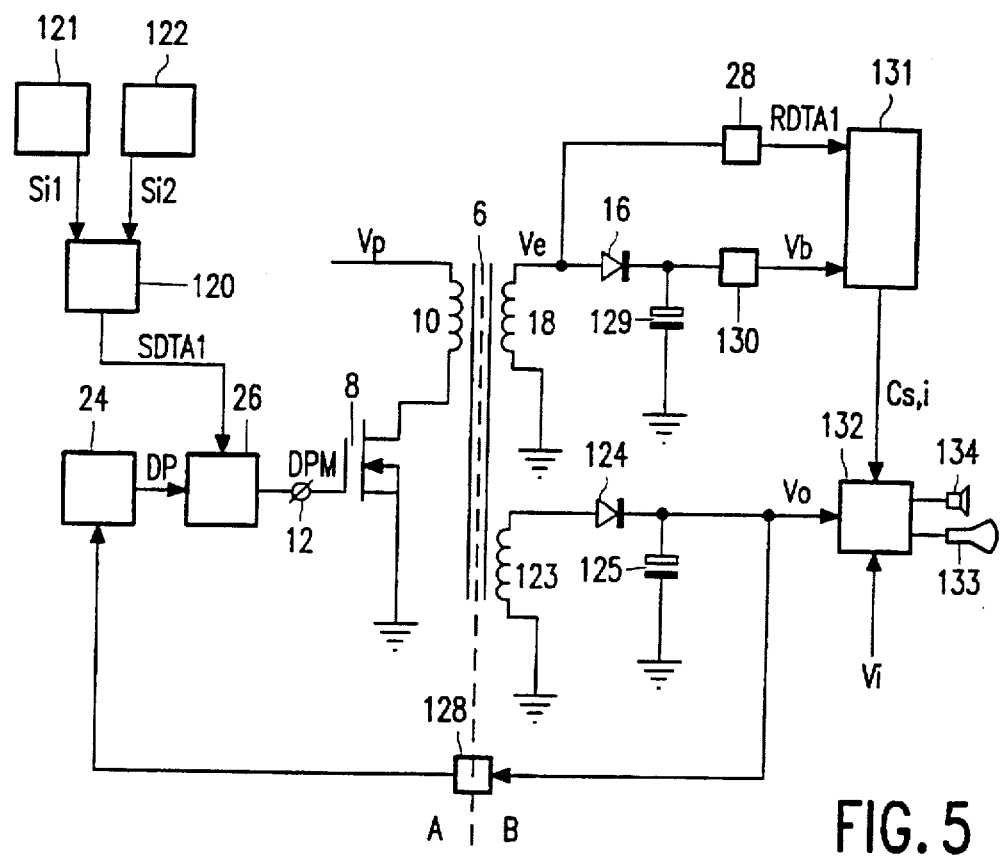
FIG. 5 shows a basic circuit diagram of a television receiver which comprises a power-supply and communication circuit according to the invention.

FIG. 5 shows a basic circuit diagram of a television receiver which comprises a power supply and communication circuit according to the invention. The television receiver is divided into a non mains-insulated primary side A and a mains-insulated secondary side B by a transformer 6 which has a primary winding 10, a first secondary winding 18, and a second secondary winding 123. A series arrangement of the primary winding 10 and a switching element 8 is coupled between a rectified mains voltage VP and the primary ground potential. The switching element 8 may be a FET, a bipolar transistor, or any other suitable semiconductor switch. An oscillator circuit 24 supplies control pulses DP to a first means further referred to as interrupting circuit 26. The interrupting circuit 26 suppresses control pulses DPM to be supplied to a control input 12 of the switching element 8. A small microcomputer 120 receives information signals Si1,Si2 from a remote control receiver 121 or a local keyboard 122, respectively, and supplies an input data signal SDTA1 to the interrupting circuit 26.

A rectifier diode 124 is coupled to the second secondary winding 123 to supply a second output voltage Vo which is smoothed by a capacitor 125. The second output voltage Vo is coupled to a feedback input of the oscillator circuit 24 via a feedback circuit 128 which comprises a mains-insulated component, for instance an opto-coupler or a small transformer. The feedback input receives a feedback signal for controlling the control pulses DP in such a way that the second output voltage is stabilized.

A first secondary winding 18 supplies a first secondary voltage Ve which is rectified by a rectifier diode 16 and smoothed by a capacitor 129. A voltage stabilizer 130 stabilizes the first secondary voltage to obtain a supply voltage Vb for a micro- computer 131. A second means further referred to as detector circuit 28 receives the secondary voltage Ve and supplies an output data signal RDTA1 to the microcomputer 131. The microcomputer 131 generates control signals Cs,i in response to the output data signal RDTA1. The control signals Cs,i are supplied to signal-processing and deflection circuitry 132 to control functions in the television receiver like on/off switching, contrast, volume. The signal-processing and deflection circuitry 132 receives input information Vi, for example an antenna signal, and the second output voltage Vo, and supplies audio signals to a loudspeaker 134 and video and deflection signals to the picture tube 133. For the sake of simplicity, only the second output voltage Vo supplies power to the signal-processing and deflection circuitry 132, in practice more supply voltages may be generated by the power supply to supply this circuitry 132.

If both information signals Si1,Si2 are inactive, the power-supply and communication circuit operates as follows. The oscillator circuit 24 generates the periodical control pulses DP which are passed through the interrupting circuit 26 to switch the switching element 8 on during an on-period and off during an off-period, the on and offperiods forming a switching period. In this situation, the interrupting circuit 26 does not influence the control pulses DP. Depending on the operating principle of the supply, the repetition frequency and/or duty-cycle of the control pulses DP is controlled in response to the second output voltage Vo to stabilize this second output voltage Vo. It is also possible to stabilize the second output voltage Vo indirectly by stabilizing a primary voltage available on an extra primary winding (not shown). As an on and an off-period is generated during every switching period, the detection circuit 28 will not detect an output data signal RDTA1, as will be explained hereinafter with reference to FIG. 6.

If the small microcomputer 120 receives an active information signal Si1,Si2, it detects whether the information signal Si1 is a command which is addressed to the television receiver. If not, no further action is taken, if yes, the small micro- computer 120 transfers the relevant part of the command to the microcomputer 131 at the secondary side via the power supply, as will be explained hereinafter. The local keyboard generates the information signal Si2 which is intended to be a command for the television receiver.

The transfer of the input data signal SDTA1 from the primary side to the secondary side is explained, by way of example, if the information signal is a Philips RC5 signal as generated, for example, by the Philips remote control transmitter integrated circuit SAA3010. This RC5 signal consists of packets of 14 bits, each packet comprising 2 start bits, 1 control bit, 5 system bits which determine the system (kind of apparatus) addressed, and 6 command bits which define the command for the addressed system. The bits are transmitted in biphase technique, with a bit time of about 1.8 milliseconds. The packets may follow each other in about 114 milliseconds. In this case, the command addresses the television receiver with the system bits, and the relevant part to be transferred to the secondary side comprises the 6 command bits, the control bit, and depending on the communication protocol between the small micro- computer 120 and the microcomputer 131 at the secondary side, an additional start bit and parity bit. Consequently, a total of 9 bits is transferred. The small microcomputer 120 translates the received command bits into an input data signal SDTA1. For every bit which has to be transferred and has a logic one value, the input data signal SDTA1 causes the interrupting circuit 26 to keep the switching element 8 switched off for at least one switching period. If the input data signal SDTA1 is not synchronized with the switching periods of the power supply, this can be obtained by generating the input data signal SDTA1 to be a pulse lasting at least two switching periods. For every bit which has to be transferred and has a logic zero value, the input data signal SDTA1 has such a value that the control pulses DP supplied by the oscillator circuit 24 are not suppressed by the interrupting circuit 26. In this case, no more than one or two switching periods of the power supply are suppressed every data bit which has to be transferred. So, if the switching period of the power supply lasts 25 microseconds and 9 bits are transferred by suppressing two switching periods, only 9 times 2 times 25 microseconds in a period of 114 milliseconds (time between two bursts of 9 bits) of the switching periods of the power supply are skipped, which is about 0.4%. Consequently, the operating of the power supply is hardly influenced by the data transfer.

The small microcomputer is not essential to the basic idea of the invention which is the skipping of switching periods to transfer data from the primary side to the secondary side of a power supply. The information signal Si1 could be coupled to the oscillator circuit 24 directly, but then about 7% of the switching periods is skipped (9 times 0.9 milliseconds (half a bit time due to the biphase technique) of the 114 milliseconds).

The small microcomputer 120 at the primary side A can be used advantageously in that it may translate the bit rate of the received information signals Si1,Si2 into a lower bit rate, if a better performance of the power supply is desired, or if the bit rate of the information signal Si1,Si2 is much higher than that of the above-mentioned RC5-code. A further advantage of the small microcomputer 120 is that it is possible to keep the power supply switched off in a standby mode of the television receiver to obtain a minimal power consumption. The small microcomputer 120 is supplied from the mains directly or by a very small separate standby supply. If the small microcomputer 120 detects a command that is relevant for the television receiver, it will start the power supply to generate the supply voltage Vb for the micro-computer 131 at the secondary side and then transfers the data to the microcomputer 131 at the secondary side which takes the action corresponding to this command.

Figure 6:
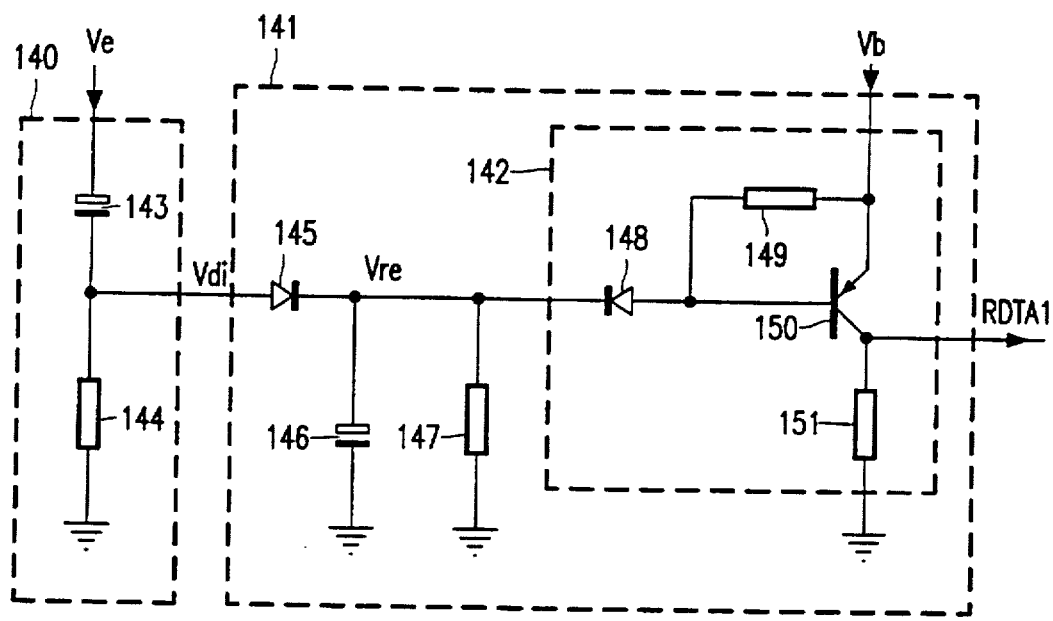
FIG. 6 shows a circuit diagram of an embodiment of a detection circuit according to the invention.

FIG. 6 shows a circuit diagram of an embodiment of a detection circuit 28 according to the invention, and FIG. 7 shows waveforms of signals occurring in the detection circuit 28 as shown in FIG. 6. The detection circuit 28 comprises an edge-detecting circuit 140 and a timing circuit 141. The edge-detecting circuit receives the first secondary voltage Ve and supplies a trigger signal Vdi to a timing circuit 141. The trigger signal Vdi indicates level changes in the first secondary voltage Ve. The timing circuit 141 supplies the output data signal RDTA1 which comprises a pulse if the timing circuit 141 does not detect a subsequent trigger voltage Vdi within a given period of time which is related to the switching period of the power supply. Thus, if no switching periods are suppressed, the edge-detecting circuit 140 detects edges (because levels are changing) in the first secondary voltage Ve every switching period. If one or more switching periods are suppressed in response to a bit in the input data signal SDTA1 which has a logic one value, the edges detected by the edge-detecting circuit 140 will not succeed each other within the given time period and an output pulse is generated.

Figure 7A:
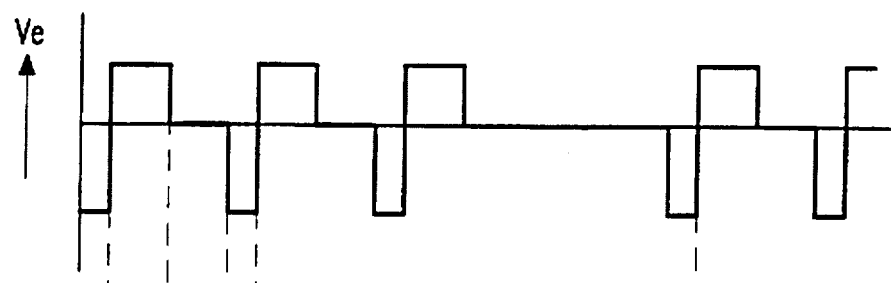
FIG. 7 shows waveforms of signals occurring in the detection circuit as shown in FIG. 6.
Figure 7B:
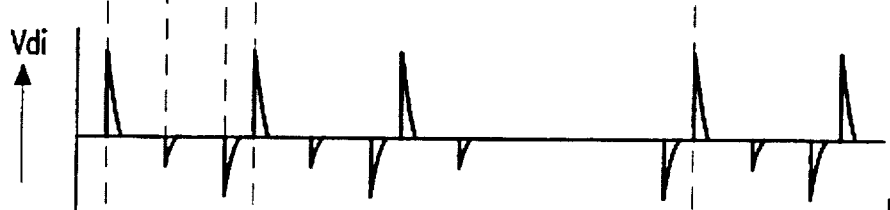
Figure 7C:
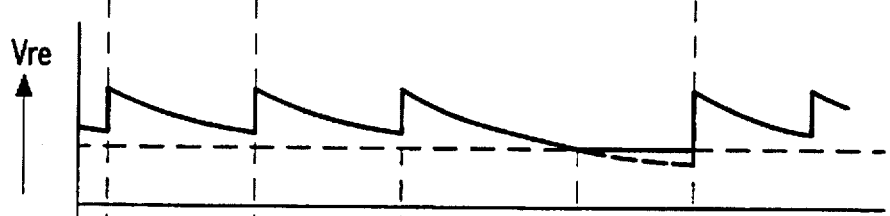
Figure 7D:
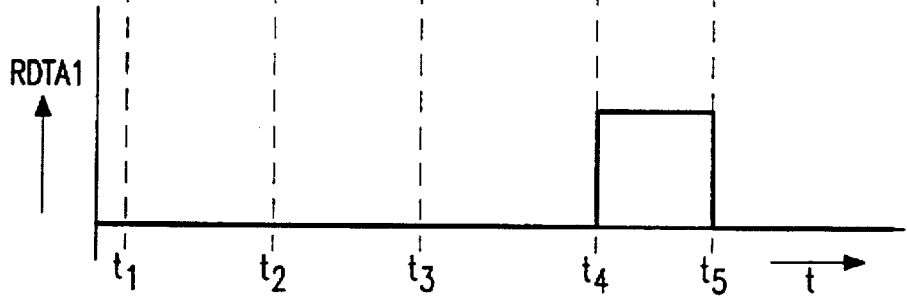

The edge-detecting circuit 140 comprises a series arrangement of a capacitor 143 receiving the first secondary voltage Ve (see FIG. 7A) and a resistor 144, one end of which is connected to the secondary ground. The trigger signal Vdi, which is available at the junction of the capacitor 143 and the resistor 144, is a differentiated first secondary voltage Ve (see FIG. 7B). The timing circuit 141 comprises a series arrangement of a diode 145 which has an anode to receive the trigger signal Vdi and a parallel arrangement of a capacitor 146 and a resistor 147 connected by means of a free end to the secondary ground. The timing circuit 141 further comprises a comparator 142 with a further diode 148 which has a cathode connected to the anode of the diode 145, and an anode connected to a base of a pnp-transistor 150. The transistor 150 has an emitter connected to the supply voltage Vp, and a collector coupled to the secondary ground via a resistor 151. A resistor 148 is connected between the base and the emitter of the transistor 150. The output data signal RDTA1 is available on the collector of the transistor 150. The voltage Vre across the capacitor 146 is shown in FIG. 7C. The diode 145 charges the capacitor 146 with positive pulses which correspond to rising edges of the first secondary voltage Ve. The capacitor 146 is discharged by the resistor 147 with a time constant such that the voltage Vre decreases below a given level L1 only if one (or more) switching period is (are) suppressed (t1–t5). The comparator 142 generates a pulse (see FIG. 7D) forming the output data signal RDTA1 if the voltage Vre decreases below the given level L1 determined by the supply voltage Vp, the base emitter voltage of the transistor 150 and a forward voltage across the diode 148.

It will be evident that variants of the embodiments described are possible within the scope of the invention. The invention can be implemented in several power supply topologies, such as for example, a flyback converter, a forward convertor, a buck regulator or a bridge topology.

The reference signs within parentheses used in the claims are not to be understood to limit the scope of the claims.

We claim:

1. A power-supply and communication circuit for an electrical apparatus, the circuit comprising:

a first electrical unit, a second electrical unit which receives electric power from the first electrical unit via a transformer having a primary and a secondary winding, the secondary winding supplying a secondary alternating voltage ($V_e$), and means for transmitting data signals between the first electrical unit and the second electrical unit via the transformer, wherein the power supply further comprises a switching element in series with the primary winding, which switching element has a control terminal for receiving control pulses (DPM) for periodically turning on and turning off the primary winding, at least one combination of a first combination of first means for obtaining suppression of said periodical turning on and off of the primary winding in response to a first data signal (SDTA1) generated in the first electrical unit, and second means in the second electrical unit for detecting fluctuations in the secondary alternating voltage ($V_e$) as a result of said suppression, and a second combination of third means for actively modulating the secondary alternating voltage ($V_e$) in response to a second data signal (SDTA2) generated in the second electrical unit, and fourth means in the first electrical unit for detecting fluctuations in a primary alternating voltage ($V_d$) across the primary winding as a result of the modulation of the secondary alternating voltage ($V_e$).

2. A power-supply and communication circuit as claimed in claim 1, wherein the first means comprise a first switching transistor having a control electrode for receiving the first data signal (SDTA1) and having a main current path connected to the control terminal of the switching element.

3. A power-supply and communication circuit as claimed in claim 1, wherein the second means comprise a first peak detector coupled to the secondary winding.

4. A power-supply and communication circuit as claimed in claim 1, wherein a first rectifier diode is coupled in series with the secondary winding for supplying a direct voltage (Vs1), and in that the third means comprise a second switching transistor and a load element coupled in series with the direct voltage, a control electrode of the second switching transistor being arranged to receive the second data signal (SDTA2).

5. A power-supply and communication circuit as claimed in claim 4, wherein the second electrical unit (4) comprises a second rectifier diode connected in series with said first rectifier diode, and a first zener diode connected to the direct voltage (VS1) generated by the first and second rectifier diodes, and that the load element is a second zener diode connected to a node between the first and the second rectifier diodes.

6. A power-supply and communication circuit as claimed in claim 1, wherein the fourth means comprise a second peak detector coupled to a node between the primary winding and the switching element.

7. A power-supply and communication circuit as claimed in claim 1, wherein the first (SDTA1) and/or second (SDTA2) data signal have been encoded in accordance with a biphase code.

8. A power-supply and communication circuit as claimed in claim 1 which further comprises a microcomputer for receiving an information signal (Si1,Si2) comprising a word made up of bits, the word comprising a first group of bits for determining an addressed system, and a second group of bits for determining a command for the addressed system, and in that the microcomputer is arranged to generate the data signal (SDTA1) having a pulse in response to every bit of the second group of bits which is a logic one, wherein each pulse keeps the switching means open during at least one switching period.

9. A power-supply and communication circuit as claimed in claim 1, wherein the power-supply and communication circuit further comprises:

a microcomputer for receiving an information signal (Si1,Si2) comprising a stream of bits having a given bit rate, and for supplying the data signal (SDTA1) comprising a pulse in response to every bit of the stream of bits which is a logic one, wherein each pulse keeps the switching means open during at least one switching period and wherein the pulses have a repetition rate which is lower than the given bit rate.

10. A power-supply and communication circuit as claimed in claim 1, wherein the second means comprise:

an edge-detecting circuit for receiving the secondary voltage (Ve) to supply a trigger signal (Vdi), wherein the trigger signal (Vdi) indicates a level change of the secondary voltage (Ve), and a timing circuit for receiving the trigger signal (Vdi) to supply the output data signal (RDTA1) comprising a pulse if the timing circuit does not detect a subsequent trigger signal (Vdi) within a given period of time, which period of time is related to the switching period of the power supply.

11. An electrical apparatus comprising:

a power-supply and communication circuit as claimed in claim 1, wherein the transformer comprises a further secondary winding supplying a further secondary voltage (Vo), signal-processing and deflection circuitry receiving an input signal (Vi) and the further secondary voltage (Vo) to generate drive signals (D) for driving a picture display device, and a microcomputer receiving the output data signal (RDTA1) and supplying command signals (Csi) to control the signal-processing and deflection circuitry.

12. An electrical apparatus comprising a first functional unit and a second functional unit cooperating therewith, and a power-supply and communication circuit as claimed in claim 1, the first electrical unit and the transformer being included in the first functional unit and the second electrical unit being included in the second functional unit.

13. An electrical apparatus as claimed in claim 12, wherein the apparatus is a vacuum cleaner, the first functional unit being a canister accommodating the first electrical unit and the transformer, and the second functional unit being a suction part which can be coupled to the canister and which comprises a handle which accommodates the second electrical unit, coupling of the suction part to the canister resulting in an electrical connection being made between the secondary winding of the transformer and the second electrical unit.

14. An electrical apparatus as claimed in claim 13, wherein the suction part comprises a hose in which electrical conductors are included, which conductors, at one end, are coupled to the second electrical unit in the handle and at the other end can be coupled electrically to the secondary winding of the transformer in the canister.

15. A handle for a vacuum cleaner, the handle comprising an electrical unit for receiving an alternating voltage ($V_e$), wherein the alternating voltage ($V_e$) includes periodical waveforms suppressed in response to an input data signal (SDTA1), and the electrical unit comprises means for detecting fluctuations in the alternating voltage ($V_e$) to supply an output data signal (RDTA1) which is a regenerated input data signal (SDTA1), and means for actively modulating the alternating voltage ($V_e$) in response to a second data signal (SDTA2) thereby to supply a further output signal for a further electrical unit which is external to the electrical unit.

16. A handle for a vacuum cleaner as claimed in claim 15 wherein the further electrical unit comprises a transformer having a primary winding coupled to a source of periodic voltage and a secondary winding for supplying said alternating voltage ($V_e$), and said input data signal is transmitted to the detecting means via the transformer and the further output signal is transmitted to the further electrical unit via the transformer.

17. A suction part for a vacuum cleaner, the suction part comprising:

an assembly of a hose; and a handle, the hose comprising:

electrical coupling means at a first end of the hose for coupling the hose to a canister of the vacuum cleaner; and electrical conductors for transporting an alternating voltage ($V_e$) from the first end of the hose to the handle, the handle accommodating an electrical unit for receiving the alternating voltage ($V_e$), wherein the alternating voltage ($V_e$) includes periodical waveforms suppressed in response to an input data signal (SDTA1), and the electrical unit comprises means for detecting fluctuations in the alternating voltage ($V_e$) to supply an output data signal (RDTA1) comprising a regenerated input data signal (SDTA1).

* * * * *